United States Patent
Gunda et al.

(10) Patent No.: US 9,006,977 B2
(45) Date of Patent: Apr. 14, 2015

(54) SYSTEMS AND METHODS FOR POWER SUPPLY LOAD DETECTION WITH HOT-PLUG COMPATIBILITY

(71) Applicants: Avinash Gunda, Danville, NH (US); Christian Breuer, Newburyport, MA (US); Markus Ziegler, Watertown, MA (US)

(72) Inventors: Avinash Gunda, Danville, NH (US); Christian Breuer, Newburyport, MA (US); Markus Ziegler, Watertown, MA (US)

(73) Assignee: OSRAM SYLVANIA Inc., Danvers, MA (US)

( * ) Notice: Subject to any disclaimer, the term of this patent is extended or adjusted under 35 U.S.C. 154(b) by 76 days.

(21) Appl. No.: 13/794,527

(22) Filed: Mar. 11, 2013

(65) Prior Publication Data

US 2014/0252955 A1    Sep. 11, 2014

(51) Int. Cl.
*H05B 37/03* (2006.01)
*H05B 33/08* (2006.01)

(52) U.S. Cl.
CPC .................................. *H05B 33/0803* (2013.01)

(58) Field of Classification Search
CPC ................................ H05B 37/00; H05B 41/00
USPC ........................................................ 315/119
See application file for complete search history.

(56) References Cited

U.S. PATENT DOCUMENTS

| 7,211,991 | B2* | 5/2007 | Balakrishnan et al. | 323/277 |
| 2005/0067902 | A1* | 3/2005 | Bemat et al. | 307/140 |
| 2006/0071639 | A1* | 4/2006 | Ross et al. | 320/116 |
| 2007/0029979 | A1* | 2/2007 | Williams et al. | 323/217 |
| 2008/0297067 | A1* | 12/2008 | Wang et al. | 315/294 |
| 2010/0060189 | A1* | 3/2010 | Stevens et al. | 315/291 |
| 2010/0308749 | A1* | 12/2010 | Liu | 315/307 |
| 2011/0254508 | A1* | 10/2011 | Sakakibara | 320/118 |

FOREIGN PATENT DOCUMENTS

WO    WO 2011126374 A2 *  10/2011

* cited by examiner

*Primary Examiner* — Crystal L Hammond
(74) *Attorney, Agent, or Firm* — Shaun P. Montana

(57) ABSTRACT

Systems and methods for detecting an incorrect load and preventing powering of that load, until a load change is detected, are disclosed. An incorrect load can be removed and a newly attached valid load can be operated without requiring a reset. A power supply or driver system for a lighting system including one or more solid state light sources includes the systems and methods. The power supply or driver system includes a processor and memory arrangement configured to detect whether a load is operable or non-operable while still being responsive to a new load being attached at any time, and to prevent the system from checking the same load more than once. These may be used in conjunction with features like auto-recovery, restart after faults, and load-hot-plug capability, while perhaps simultaneously reducing cyclical flashing of light output.

20 Claims, 6 Drawing Sheets

SYSTEMS AND METHODS FOR POWER SUPPLY LOAD DETECTION WITH HOT-PLUG COMPATIBILITY

CROSS-REFERENCE TO RELATED APPLICATION

The present application is related to U.S. patent application Ser. No. 13/794,500, filed Mar. 11, 2013 and entitled "SYSTEMS AND METHODS OF PREVENTING STROBING LIGHT OUTPUT", the entire contents of which are hereby incorporated by reference.

TECHNICAL FIELD

The present invention relates to lighting, and more specifically, to power supplies for one or more solid state light sources.

BACKGROUND

Solid state light sources, such as but not limited to light emitting diodes (LEDs) and their related sources (e.g., organic LEDs (OLEDs), polymer LEDs (PLEDs), and the like) and the circuits that drive them (commonly referred to as drivers and/or driver circuits) are typically manufactured separately and electrically connected afterwards in a given lighting system. Simple and cheap drivers for series connection of solid state light sources are known that consist of a bridge rectifier and a filtering capacitor in parallel to the one or more solid state light sources, which are typically arranged in a string, as is well known in the art. Optionally, a linear resistance controller in series to the string of solid state light sources may be added. Powering light sources within a lighting system involves a number of non-trivial issues, particularly with respect to the driver component of the lighting system, such as meeting performance and safety standards.

SUMMARY

Powering light sources of a lighting system involves a number of non-trivial issues, particularly with respect to the driver component of the lighting system, such as meeting performance and safety standards. For instance, a power supply used to power solid state light sources is typically specified to operate with specific load conditions. A load that is out-of-specification may be due to, for example, misuse, improper load or invalid configuration, faulty components (in the power supply and/or load), or extended operation in harsh environments, to name a few examples. Regardless of the root cause, a power supply that is connected to an invalid load is an undesirable situation, and may give rise to a number of issues.

Embodiments are provided that check for an invalid load before powering a given load in normal operation. In some embodiments, a method for checking for an incorrect load before powering a given load may include allowing a small amount of current to flow through the load, and involves waiting for the load to be changed when that load is found to be invalid. In more detail, the load voltage is checked at startup, before enabling the output of an output regulator stage of the power supply. If the load voltage is close or equal to the bus voltage (e.g., open-circuit), the output remains disabled. If the load voltage is close or equal to zero volts (e.g., short circuit or improper resistive load), the output remains disabled. Otherwise, the output is enabled and immediately monitored. If the load voltage stays in the normal operating range with full output current, the power supply continues to operate. If the load voltage leaves the valid range, the output is disabled. Once a load is detected as invalid, the power supply will monitor the load voltage and look for the old load to be disconnected (e.g., leaving open-circuit conditions), and wait for a new load to be attached. When a new load is attached the process may be repeated. Embodiments thus accommodate removing an incorrect load and operating a newly attached valid load without requiring a reset, and may be used to eliminate or otherwise reduce cyclical flashing of light in conjunction with features like auto-recovery/restart-after-faults and load hot-plug capability.

In some embodiments, the load detection techniques are used in conjunction with cyclic detection and prevention techniques that may be programmed or otherwise configured into an existing microcontroller or other suitable processor of the power supply system or driver circuit. Once cyclic behavior (e.g., strobing light source condition) is detected, the microcontroller may then disable or otherwise interrupt the supply of power to the light engine including the solid state light sources. In some embodiments, a dedicated device that is deployed either internally or externally to the power supply and is configured to detect and prevent undesired output cycling is used. In some embodiments, the dedicated cyclic detection and prevention device is operatively coupled, for example, between the power supply and the load. In some embodiments, this dedicated device is configured, for example, to measure the power draw of the power supply and interrupts or otherwises cut power when it detects cyclic behavior. As will be appreciated in light of this disclosure, embodiments provided herein may be further implemented in conjunction with other protection circuits for known potential failures.

As discussed above, embodiments may be used in conjunction with features like auto-recovery/restart-after-faults and load hot-plug capability. Hot-plug capability generally refers to the ability to connect/disconnect a load at random from a powered and operating system while ensuring that the system automatically re-enters a normal operating state when a valid load is attached without needing a system reset. Numerous other advantages of various embodiments of the present invention will be apparent in light of this disclosure. For instance, one advantage of a power supply system configured according to embodiments disclosed herein is that it may reduce the liability burden on the power supply designer and manufacturer for dangerous lighting conditions as a result of a fault within the power supply system. Some embodiments may reduce the need to permanently disable a given power supply, depending on a given failure mode, such as in case the fault itself is temporary.

In an embodiment, there is provided a method. The method includes: measuring a load voltage of a power supply to which a load is connected and receiving power; and in response to the measured load voltage being outside a specified range: disabling an output of the power supply; and preventing the output of the power supply from being re-enabled until a load change is detected.

In a related embodiment, prior to measuring the load voltage, the method may include enabling the output of the power supply to provide a small test current that is 10% or less of a full current capability of the power supply. In another related embodiment, measuring may include measuring a load voltage of a power to which a load is connected and receiving power, wherein the power supply comprises an output regulator stage that receives a bus voltage and generates an output voltage therefrom to be applied to the load, and the method may further include determining if the measured load voltage is outside the specified range by comparing the measured load voltage to at least one of the bus voltage and ground potential. In a further related embodiment, if the measured load voltage is within a given tolerance of the bus voltage or ground potential, the method may further include not enabling or otherwise disabling the output of the power supply. In another further related embodiment, if the measured load voltage is between the bus voltage less a given tolerance and ground potential plus a given tolerance, the method may further include enabling the output of the power supply. In a further related embodiment, the method may further include re-measuring the load voltage. In a further related embodiment, in response to the re-measured load voltage being outside the specified range, the method may further include: disabling the output of the power supply; and preventing the output of the power supply from being re-enabled until a load change is detected.

In another embodiment, there is provided a non-transitory computer readable medium encoded with instructions that, when executed by one or more processors, cause a power supply to power a light source load, by performing operations of: measuring a load voltage of the power supply; and in response to the measured load voltage being outside a specified range: disabling output of the power supply; and detecting a load change before re-enabling the output of supply.

In a related embodiment, prior to measuring the load voltage, the processor may perform operations of enabling the output of the power supply to provide a small test current that is 10% or less of full current capability of the power supply. In another related embodiment, the power supply may include an output regulator stage that receives a bus voltage and generates an output voltage therefrom to be applied to the light source load, and the processor may perform further operations of determining if the measured load voltage is outside the specified range by comparing the measured load voltage to at least one of the bus voltage and ground potential. In a further related embodiment, if the measured load voltage is within a given tolerance of the bus voltage or ground potential, the processor may perform further operations of not enabling or otherwise disabling the output of the power supply. In another further related embodiment, if the measured load voltage is between the bus voltage less a given tolerance and ground potential plus a given tolerance, the processor may perform further operations of enabling the output of the power supply. In a further related embodiment, the processor may perform further operations of re-measuring the load voltage. In a further related embodiment, in response to the re-measured load voltage being outside the specified range, the processor may perform further operations of: disabling the output of the power supply; and preventing the output of the power supply from being re-enabled until a load change is detected.

In another embodiment, there is provided a system for powering a light source load with a power supply. The system includes: an input conversion stage configured to convert a first voltage source to a second voltage source; an output regulator stage configured to receive the second voltage source and to provide a power source to drive the load; and a controller comprising a processor and a memory with instructions encoded thereon that, when executed by the processor, cause the system to: measure a load voltage of the power supply; and in response to the measured load voltage being outside a specified range: disable output of the power supply; and prevent the output of the power supply from being re-enabled until a load change is detected.

In a related embodiment, the system may be configured to allow a current to flow through the load to facilitate sensing characteristics of the load without enabling the output regulator stage, wherein the current may be in the microamp to milliamp range. In another related embodiment, the output regulator stage may be configured to receive a bus voltage from the input conversion stage and to generate an output voltage therefrom to be applied to the load, and the system may be further configured to determine if the measured load voltage is outside the specified range by comparing the measured load voltage to at least one of the bus voltage and ground potential. In a further related embodiment, if the measured load voltage may be within a given tolerance of the bus voltage or ground potential, the system may be further configured to not enable or to otherwise disable the output of the power supply. In another further related embodiment, if the measured load voltage may be between the bus voltage less a given tolerance and ground potential plus a given tolerance, the system may be further configured to enable the output of the power supply. In another further related embodiment, the system may be further configured to re-measure the load voltage one or more times, and in response to the re-measured load voltage being outside the specified range, the system may be further configured to: disable the output of the power supply; and prevent the output of the power supply from being re-enabled until a load change is detected.

BRIEF DESCRIPTION OF THE DRAWINGS

The foregoing and other objects, features and advantages disclosed herein will be apparent from the following description of particular embodiments disclosed herein, as illustrated in the accompanying drawings in which like reference characters refer to the same parts throughout the different views. The drawings are not necessarily to scale, emphasis instead being placed upon illustrating the principles disclosed herein.

DETAILED DESCRIPTION

A power supply is generally designed to operate with a certain range of loads. A load outside of this range may cause incorrect operation and damage the power supply or the load, or both. Thus, embodiments are disclosed for detecting an incorrect load and preventing powering of that load until a load change is detected. The incorrect load may be due to, for example, a faulty component(s), an invalid configuration or improper use, and/or any other of various possible reasons. In any such scenarios, embodiments accommodate removing the incorrect load and operating a newly attached valid load without requiring a reset. Some embodiments may be embodied, for instance, in a power supply or lighting driver system that includes a processor and memory arrangement configured to carry out the load detection methods provided herein. In operation, the system unobtrusively detects whether a load is operable or non-operable while still being responsive to a new load being attached at any time, and the system is prevented from checking the same load more than once. The processor may be implemented, for example, as an existing microcontroller in the power supply, or as a dedicated processor. Once an out-of-specification load is detected, the power supply may be turned off or otherwise prevented from attempting to source power to the load, until a load change is detected. Embodiments may be used in conjunction with features like auto-recovery/restart-after-faults and load hot-plug capability. In some embodiments, the system may be further configured to track failures and prevent cyclical behavior when detected. Numerous variations and configurations will be apparent in light of this disclosure.

System Architecture

Figure 1:
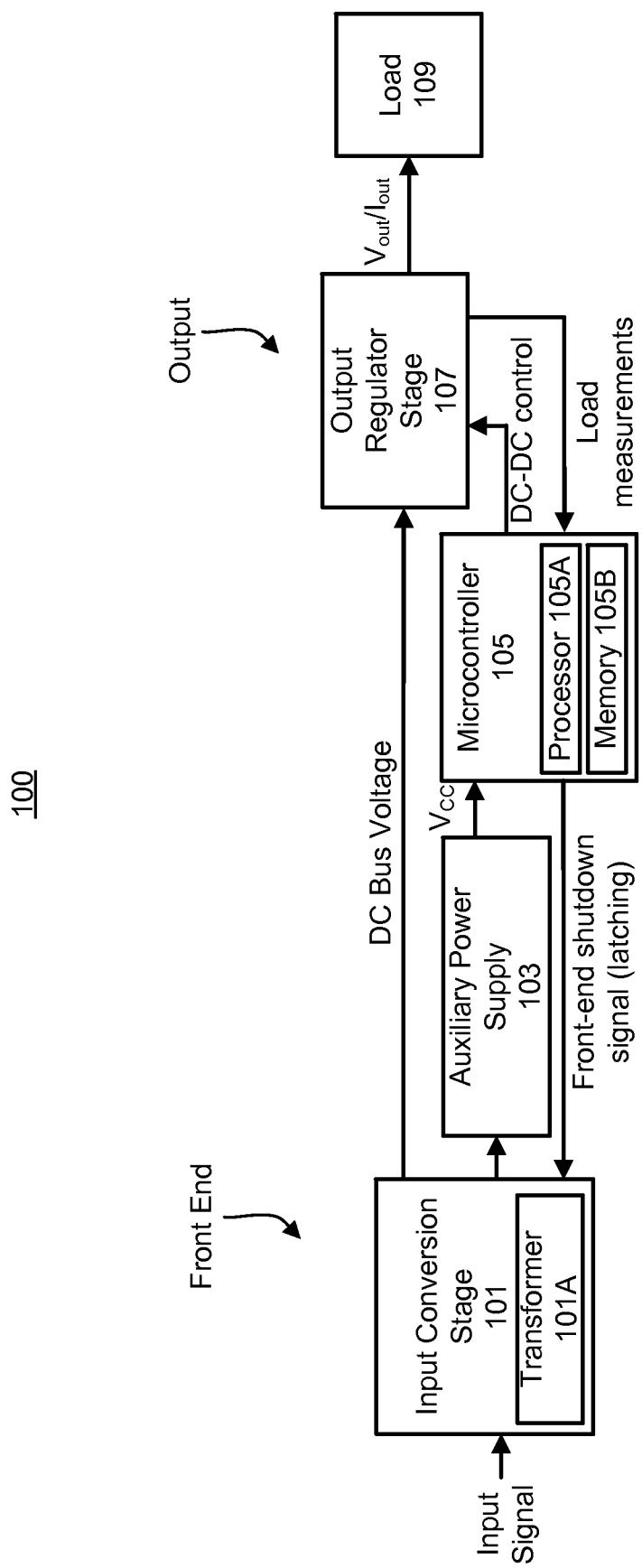
FIG. 1 shows a block diagram of a power supply system according to embodiments disclosed herein.

FIG. 1 illustrates a block diagram of a power supply system 100. The power supply system includes a front end and an output. The front end includes an input conversion stage 101 that receives an input signal, while the output includes an output regulator stage 107 configured to source voltage/current to a load 109. In some embodiments, the input conversion stage 101 receives an AC input signal, and thus the input conversion stage 101 is referred to as an AC-DC conversion stage. In some embodiments, the input conversion stage 101 receives a DC input signal, and thus the input conversion stage 101 is referred to as a DC-DC conversion stage. Embodiments are described herein in relation to the input signal being an AC input signal, but of course the invention is not so limited. The input conversion stage 101 generates a DC bus voltage that is provided to the output regulator stage 107. Thus, in some embodiments, the output regulator stage 107 is referred to as a DC-DC output regulator stage, as it receives the DC bus voltage as an input and outputs a DC signal (i.e., $V_{out}$ and/or $I_{out}$) to the load 109. In some embodiments, the load 109 is a light source that may be susceptible to strobing, such as a but not limited to one or more solid state light sources. The power supply system 100 also includes an auxiliary power supply 103. The auxiliary power supply 103 derives an auxiliary power supply voltage $V_{cc}$ from a DC output of the input conversion stage 101. The auxiliary power supply voltage $V_{cc}$ from the auxiliary power supply 103 is used to power a microcontroller 105. The microcontroller 105 includes a processor 105A and a memory 105B. A set of embedded routines is stored within the memory 105B. The microcontroller 105 is configured to control the output regulator stage 107 and to measure various parameters associated with the load 109. In addition, the microcontroller 105, in some embodiments, is further configured to control the input conversion stage 101 of the front end, and more specifically, to shut down or otherwise disable the input conversion stage 101, as is described in greater detail throughout.

The topology of the power supply system 100 may vary from one embodiment to the next, and may include any number of configurations such a fly-back converter, a buck converter, boost converter, buck-boost converter, push-pull converter, or other such topologies having an output regulator stage that may be controlled separately from an input conversion stage. Each of the depicted components may be implemented with conventional or custom technology. However, in addition to running any such typical or proprietary routines, the microcontroller 105 or equivalent device may be further configured to carry out one or more routines to unobtrusively detect whether a load is operable or non-operable while still being responsive to a new load being attached at any time, and to prevent the system from checking the same load more than once, in accordance with some embodiments. In some embodiments, these load detection techniques exist independently of other functionality, while in some embodiments, these techniques are implemented as part of an overall methodology to inhibit or otherwise reduce cyclic light output caused by any number of failure modes. In some embodiments, the load detection functionality (and other functionality, if so desired) is implemented outside the microcontroller 105, such as in a dedicated controller or circuit or other device that is specifically configured and deployed to carry out the variously disclosed load detection techniques (and possibly anti-strobing techniques). To this end, embodiments may include additional or fewer components than are shown in FIG. 1, and the invention is not intended to be limited to any specific power supply configuration or topology.

In some embodiments that include an external AC line input such as the one shown in FIG. 1, the front-end AC-DC input conversion 101 includes a transformer 101A for providing galvanic isolation for the components of the power supply 100. In some embodiments, the transformer 101A is connected to or otherwise a part of a power factor correction (PFC) circuit (not shown in FIG. 1). The PFC circuit may be, and in some embodiments is, a part of, for example but not limited to, one or more power converters that include the transformer 101A and secondary-side power circuitry, as is generally known in the art. The power circuitry on the secondary-side of the transformer may, and in some embodiments does, include, for example but not limited to, a rectifier stage and energy storage, such as but not limited to a bulk or intermediate-bus capacitor, as is typically known in the art. In any such input conversion stage configurations, an external source voltage is converted to some desired DC source voltage that is suitable for a given application.

In some embodiments, the auxiliary power supply 103 of FIG. 1 is connected to the secondary-side power circuitry of the front end, but in other embodiments it may be included in the secondary-side power circuitry, if so desired. For example, in some embodiments, the auxiliary power supply 103 is implemented with a linear voltage regulator, though any other suitable circuitry configured to derive a desired auxiliary supply voltage from the front-end secondary-side voltage may be used. In some embodiments, the auxiliary power supply 103 may be implemented with a dedicated power supply. In some embodiments, the auxiliary power supply 103 may also include, for example but not limited to, a voltage divider (for setting the level of the auxiliary voltage applied to the microcontroller 105) and a low-pass filter (to eliminate high-frequency components of an AC input signal or any unwanted switching spikes that may result from a dimmer switch or signal conditioning elements).

As previously explained, the microcontroller 105 is used to control the power supply system 100, with respect to normal operations such as but not limited to dimming control. In some embodiments, the microcontroller 105 may include a pre-established lighting control schedule (e.g., provide 80% power during the day, and transition to 25% power during the evening hours) from which an appropriate dimming signal is generated and provided to the output regulator stage 107. In addition to such lighting controls, the microcontroller 105 may be, and in some embodiments is, further programmed or otherwise configured to execute a procedure for detect whether the load is valid or not, which in some embodiments is part of an overall procedure for inhibiting or otherwise reducing cyclic light output caused by any number of failure modes, and in some embodiments, is independent of any such additional functionality. The details of an overall anti-strobing procedure is discussed further with reference to FIGS. 2a and 3, while details with respect to the load detection techniques are discussed further with reference to FIGS. 2b and 4a-b. Briefly, depending on the nature of the failure mode detected, the microcontroller 105 may disable the output regulator stage 107 and allow the input conversion stage 101 to continue to operate, or may disable both the output regulator stage 107 and the input conversion stage 101, or may disable just the input conversion stage 101. To this end, the microcontroller 105 is configured to make various load measurements to assess or otherwise detect the presence of a given failure mode, and to issue control signals to the output regulator stage 107 as well as shutdown/latch signals to the front end (i.e., to the input conversion stage 101 and/or other components of the front end). In a more general sense, the microcontroller 105 is configured to make various load measurements to assess or otherwise detect the presence of a given load including whether that load is within a given specification, and to further detect whether or not that load has changed, and to issue enable/disable control signals to the output regulator stage 107.

With respect to dimming control, in some embodiments, the output of the microcontroller 105 is a digital output signal (e.g., output of pulse width modulation module), while in some embodiments, the output is an analog output signal (e.g., DAC output or PWM output with low-pass filtering), while sin some embodiments, the output is a combination of both. Whatever the format, in some embodiments, the output is used to set a reference signal for the output regulator stage 107 and therefore to establish a current amplitude (analog dimming) or average current (PWM dimming) that is presented to the load 109 when it is a light source load. The choice between using analog dimming and PWM dimming depends on a variety of factors, such as but not limited to the application, design constraints, cost, and so on, that are considered during design of the power supply system 100. For example, in the case of the light source load being one or more solid state light sources, PWM dimming utilizing a PWM frequency above 200 Hz is usually preferred over analog dimming. The PWM dimming allows a higher dimming range, and due to its high frequency (typically more than 200 Hz), it is generally ensured that a strobing-free (sometimes also referred to as flicker-free) light from the solid state light source(s) is generated (during normal operation, not to be confused with fault-based flickering).

The output regulator stage 107 may be, and in some embodiments is, implemented as a DC-DC V-I converter, such as but not limited to a buck converter, where it is fed by a voltage source and its output appears to the load 109 as a current source (hence, a V-I converter). However, in some embodiments, other suitable converters and/or linear regulators may be used. As seen in FIG. 1, the load 109 may be driven by a voltage source or a current source, depending on the configuration of the output regulator stage 107. In some embodiments, note that any dimming circuitry, including the microcontroller 105, as well as the output regulator stage 107, may be implemented on a single chip or chip set that may be operatively coupled with the secondary-side of the transformer 101A. The PFC circuitry (not shown) may also be integrated on a chip or chip set. As will be appreciated, the degree of integration with respect to the various elements of the power supply circuitry will vary between embodiments. Some embodiments may be implemented with discrete components populated, for example, on a printed or wired circuit board. Further note that the microcontroller may already exist in a given power supply system design, and may then be further programmed or otherwise configured to carry out the techniques provided herein, including those to reduce cyclic light output.

Microcontroller or Dedicated Circuitry for Inhibiting Strobing

Figure 2A:
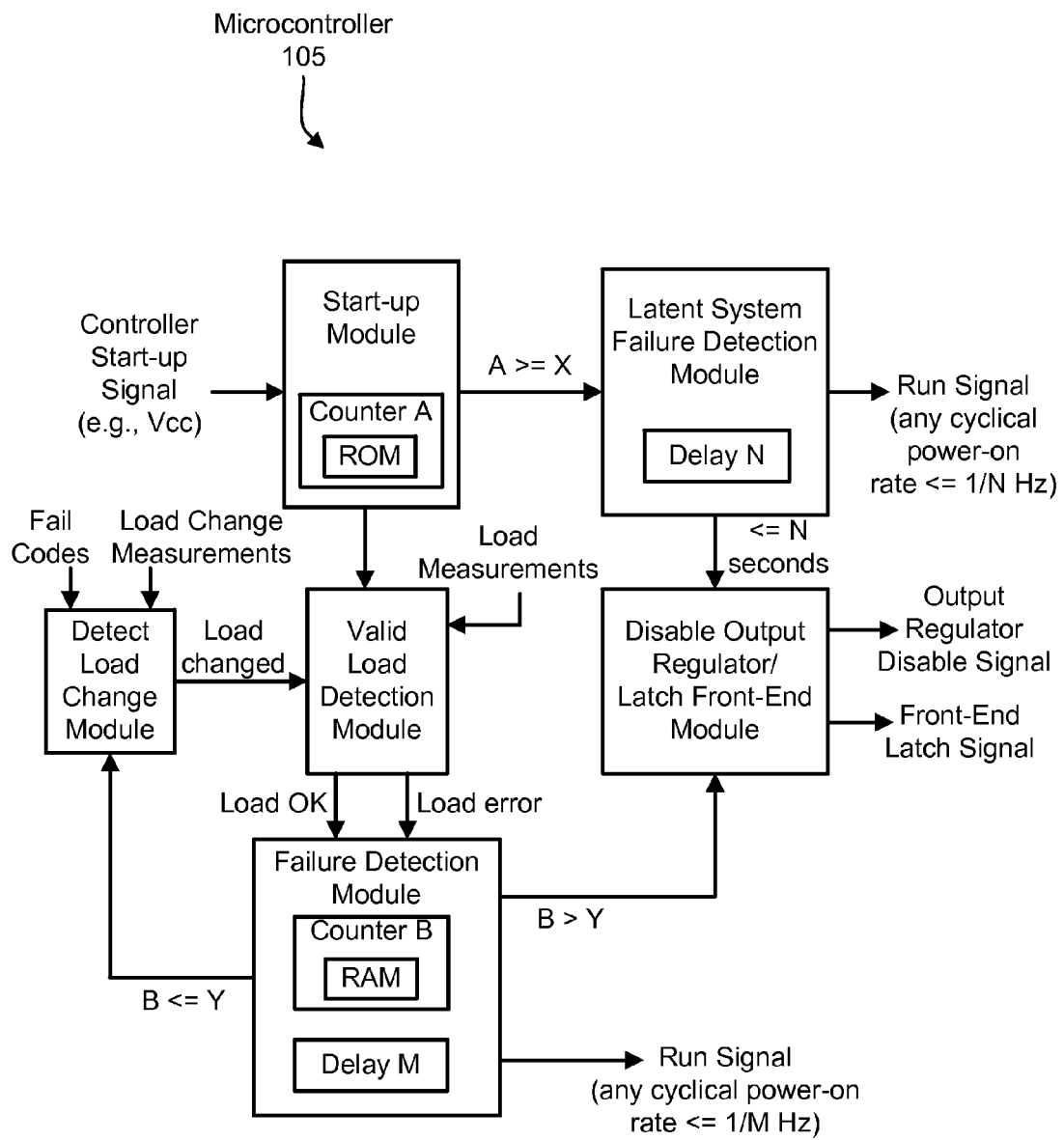
FIG. 2A illustrates a block diagram of a microcontroller of the power supply system shown in FIG. 1 according to embodiments disclosed herein.

FIG. 2A illustrates a block diagram of the microcontroller 105 of the power supply system 100 shown in FIG. 1. As previously explained, the functionality depicted may also be implemented in a dedicated module outside the microcontroller 105, that is either internal or external to the power supply system 100 of FIG. 1. Likewise, although a specific number of discrete modules are shown, some embodiments employ a different degree of integration, such as the case where some or all of the functional modules are integrated into one module, or the case where a given functional module is implemented with two or more distinct modules instead of one module. Numerous such variations and configurations will be apparent in light of this disclosure, so as to realize the functionalities provided herein.

The microcontroller 105 includes a Start-up Module configured to receive controller start-up signals (e.g., $V_{cc}$) and to maintain a non-volatile Counter A, a Latent System Failure Detection Module, a Valid Load Detection Module, a Failure Detection Module configured to receive load assessment signals and to maintain a volatile Counter B, a Detect Load Change Module, and a Disable Output Regulator/Latch Front-End Module. In general, any failure modes that occur within the time delays specified by Delay N and Delay M will not allow the corresponding Counters A and B to be reset and will therefore not allow the power supply system 100 to apply power to the load 109. For failure modes that occur after the time delays specified by Delay N and Delay M, the Counters A and B are reset, thereby allowing the power supply system 100 to cycle power to the load 109, but at a frequency determined by the value of delays associated with M and N. For instance, if M and N each equal 3 seconds, then any repetitive cycling of the power supply system 100 will have a frequency of ⅓ Hz or slower.

The microcontroller 105 uses two counters, Counter A and Counter B. The value of Counter A is stored in a non-volatile memory (e.g., read only memory, such as an EEPROM or other suitable non-volatile memory), and the value of Counter B is stored in a volatile memory (e.g., random access memory, such as an SDRAM or other suitable volatile memory). These two counters allow for protection against two general types of potential failures, including failures that allow the front end to continue functioning, and failures that do not allow the front end to continue functioning. Failures that allow the front end to continue functioning (and therefore provide power to the microcontroller 105 and its various memories) are tracked using volatile memory, because the active failure count registered in the volatile memory will not be lost when the failure mode occurs. On the other hand, failures that do not allow the front end to continue functioning, which stops power to the microcontroller 105 and its various memories, must be tracked using non-volatile memory, so the active failure count will not be lost when the failure mode occurs. Some embodiments exclusively use one or more non-volatile counters, however, non-volatile memory may be limited with respect to the number of write cycles that may be made in a given period of time, and accessing non-volatile memory by the microcontroller 105 may be more time consuming.

For failures that effect only the ability of the power supply system 100 to provide stable output power, and thus leave the front end functioning, an internal RAM-based monitoring system is used. In FIG. 2A, this RAM-based monitoring system is implemented by the collective operation of the Valid Load Detection Module, the Failure Detection Module, and the Detect Load Change Module. In operation, this RAM-based monitoring system works by tracking the quantity and frequency of invalid output conditions, based on load measurements made by the Valid Load Detection Module. These load measurements may include, but are not limited to, output voltage and/or current readings taken from the output regulator stage 107. Each time the output voltage and/or current reading are outside of a valid operating range, the Valid Load Detection Module issues a load error signal and the output of the power supply system 100 to the load 109 may be disabled. This load error event is recorded by the Failure Detection Module using the Counter B, where the Counter B is incremented for each failure, and control is then passed to the Detect Load Change Module, which is configured to wait for the detected output conditions to change before re-attempting to operate. In some embodiments, the Detect Load Change Module is programmed or otherwise configured to monitor the voltage on a filter capacitor of the output regulator stage 107 to determine if a change has occurred. If no load change has occurred, the voltage on the capacitor will not have changed significantly either. In a more general sense, the Detect Load Change Module is configured to detect conditions indicative of a load change. For example, in some embodiments the Detect Load Change Module is configured to detect a rapid positive slope on the return voltage line and when the return voltage settles at a voltage less than the bus voltage. These two conditions are indicative that a new load 109 has been connected to the power supply system 100 and may also indicate whether the new load 109 is not an improper resistive or otherwise short circuit. Other such measurements to detect load changes will be apparent. The Detect Load Changed Module may, in some embodiments does, also use fail codes (e.g., providing by existing power supply components/modules) in assessing whether a load has been changed. In any case, if the Detect Load Change Module detects that the load 109 has changed, then the Detect Load Change Module may release the hold and issue a load changed signal to the Valid Load Detection Module. The load monitoring process may repeat until the Counter B indicates the failure threshold has been exceeded (e.g., B>10). The Disable Output Regulator/Latch Front-End Module may, and in some embodiments does, then issue a disable signal to the output regulator stage 107. If the system detects that it is unable to disable the output of the output regulator stage 107, and thus of the power supply system 100, then the Disable Output Regulator/Latch Front-End Module is further configured to disable the system power input, if the particular power supply system 100 is equipped with such capabilities. As will be appreciated, this RAM-based monitoring system works to prevent cycling output power due to faulty loads or output electronics.

To prevent against faults which cause the entire power supply system 100, including the microcontroller 105, to repeatedly lose power, such a volatile count-based method is supplemented by a non-volatile count-based method. As soon as the microcontroller 105 loses power, any information about repeated failures (including any stored in the volatile Counter B) would be lost, and thus a volatile count-based method alone as described above is not sufficient. To combat this issue, non-volatile memory (e.g., EEPROM, or other suitable non-volatile memory) of the microcontroller 105 stores the Counter A. The non-volatile count-based method employs the Start-up Module and its non-volatile Counter A to track the number of times the power supply system 100 is started, based on a received controller start-up signal, such as but not limited to $V_{cc}$. After the power supply system 100 has been running for a suitable amount of time based on the Delay N (e.g., a few seconds, to affirmatively prevent rapid cycling), this count of start-up attempts is set to 0 by the Latent System Failure Detection Module. If the number of failed starts tracked in the non-volatile Counter A is ever over a predefined threshold, and the power supply system 100 fails within the time of the Delay N, then the Disable Output Regulator/Latch Front-End Module will issue a latch signal to the front end and the power supply system 100 will cease to operate until input power is cycled. In some embodiments, if the power is maintained during the latched state, the Counter B tracker may be reset in order to avoid permanently disabling the power supply system 100. Rapid flashing due to cycling power output is avoided. Since any recurring startups that happen fast enough to have negative safety effects will be detected and tracked and inhibited, any flashing light output is limited to a safe rate (e.g., less than ⅓ Hz).

Thus, the microcontroller 105 disables the output regulator stage 107 after unsuccessful attempts (as indicated by the Counter B) at operating the load 109 that do not cause the microcontroller 105 to reset. "Unsuccessful" generally means that the load 109 is not within the specified load range (with respect to, for example, power, voltage, and/or current) shortly after powering it up. In addition, the microcontroller 105 records the number of power supply startup attempts in non-volatile memory (as indicated by the Counter A). After the number exceeds a limit (e.g., X>=10), the power supply system 100 latches with the output regulator stage 107 disabled. The startup count Counter A is then reset over time, so the power supply system 100 is not permanently disabled, but rather, rapid cycling is interrupted. In embodiments where the microcontroller 105 has lost control over the output regulator stage 107, and the front end continues cycling due the one or more fault conditions, the front end is equipped with a latch switch that may be enabled by the Disable Output Regulator/Latch Front-End Module of the microcontroller 105 to disable the front end from powering up. In a more general sense, the microcontroller 105 may be, and in some embodiments is, configured with the ability to shut the primary side of the front end down to a latching off state using any number of suitable techniques, as will be appreciated in light of this disclosure.

Embodiments enable the power supply system 100 to address numerous failure modes. For example, consider the following fault scenarios. With respect to variables shown in FIG. 2, in considering these scenarios, the following assumptions should be made: Delays N and M=3 seconds; Counter A threshold X=10; and Counter B threshold X=10.

Fault on the Front End:
The front end (i.e., the input conversion stage 101 and any related circuits) shuts down each time there is power draw from the secondary side. The output regulator stage 107 works with no error.
Behavior:
The output regulator stage 107 is not started the 11th time and the power supply system 100 is halted, resulting in no visible light output from the light source load 109.
Fault on the Front End:
The front end always shuts down ~1 s after start-up, regardless of whether the output regulator stage 107 is turned on or not. The output regulator 107 stage works with no error.
Behavior:
The unsuccessful attempt Counter A will not be reset. The output regulator stage 107 will not be turned on from the 11th time on. There is no visible light output from the light source load 109.
Fault on Secondary Side:
The output regulator stage 107 cannot be controlled. The light source load 109 sees current/voltage whenever the front end delivers power. The front end works with no error.

Behavior:

The front end will be shutdown via latching after the 11th startup. There is no visible output from the light source load 109.

Faulty Load:

Power, voltage, or current are out of range. The power supply system 100 works with no error.

Behavior:

The output of the power supply system 100 will not be activated after the 11th attempt. There is no visible light output from the light source load 109.

Failure modes where the fault occurs/exhibits effects after the consideration time set by the Delays N and M (e.g., 3 seconds) are not prevented. "Consideration time" is the time after a power up is considered successful. However, in such embodiments, note that the cycle frequency is limited (e.g., if the Delays M and N equal 3 seconds, the worst case cycle frequency is ⅓ Hz or slower). Of course, the numeric parameters for the number of startup attempts (variables X and Y in FIG. 2) and time when a start is considered successful (variables M and N in FIG. 2) may be adjusted to the application. In some embodiments, a failure rate may be tracked and used rather than an absolute failure count. In some embodiments, the number of failures per a given time period are computed as a rolling average. If the computed average exceeds the given threshold, appropriate action is taken as provided herein. This allows the power supply system 100 to distinguish between hard failure rates and soft failure rates.

Microcontroller or Dedicated Circuitry for Load Detection

Numerous variations on the configuration of the microcontroller 105 will be apparent in light of this disclosure. For example, the microcontroller 105 shown in FIG. 2B does not include the Start-up Module or the Counter A, the Latent System Failure Detection Module or the Delay N, or the Failure Detection Module or the Counter B or the Delay M. In such embodiments, the various load measurements are made by the Valid Load Detection Module to determine if the load 109 is within the designated range. If so, the Valid Load Detection Module is programmed or otherwise configured to allow the output regulator 107 to be enabled until an invalid load is detected by the Valid Load Detection Module. If the Valid Load Detection Module detects an invalid load, then the Valid Load Detection Module issues a load error signal to the Disable Output Regulator Module, which disables the output regulator stage 107. Control is then passed to the Detect Load Change Module, which is programmed or otherwise configured to operate to detect a change in load as explained throughout. In other load detection focused embodiments, the Valid Load Detection Module issues a disable signal directly to the output regulator stage 107, such that a separate Disable Output Regulator Module is not needed. Similarly, the functionality of the Detect Load Change Module may be, and in some embodiments is, integrated into the Valid Load Detection Module. Numerous such variations will be apparent in light of this disclosure.

Figure 2B:
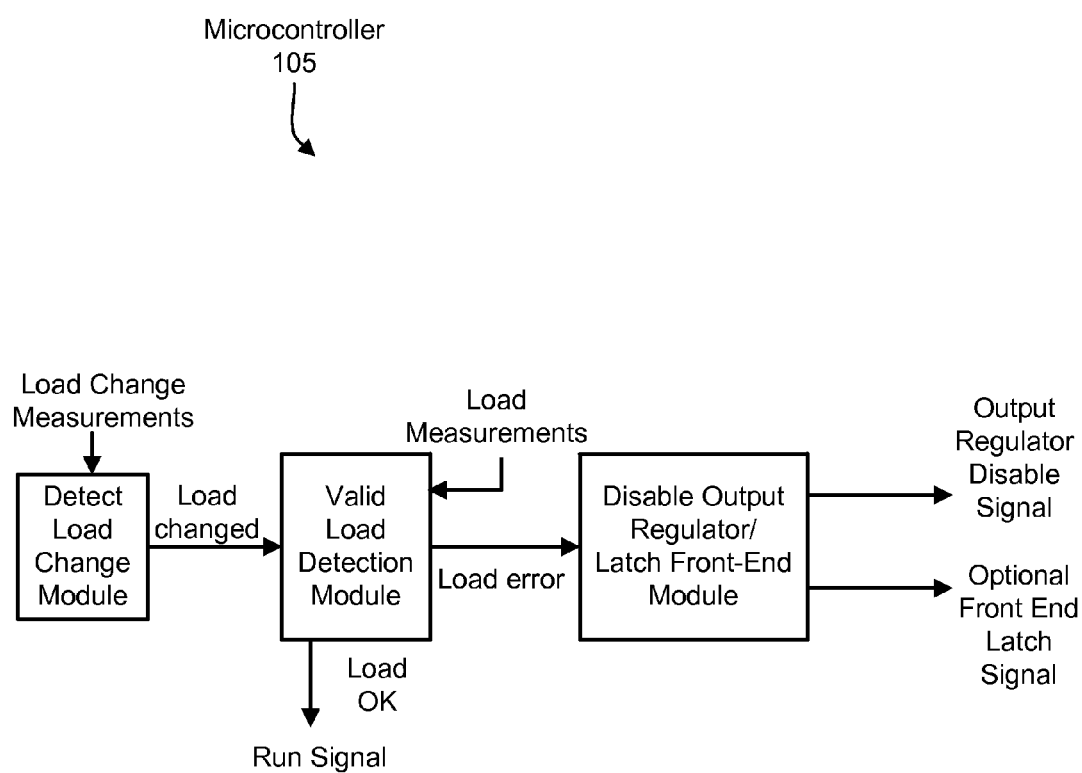
FIG. 2B illustrates a block diagram of a microcontroller of the power supply system shown in FIG. 1 according to embodiments disclosed herein.

Each of the functional modules shown in FIGS. 2A-2B may be, and in some embodiments are, implemented as one or more executable routines using any suitable programming language (e.g., C, C++, object-oriented C, proprietary instruction sets, etc), and encoded on one or more non-transient machine readable mediums, that when executed by one or more processors, carry out the functionalities described herein. The processor(s) may be, and in some embodiments are, the processor 105A within the microcontroller 105 as shown in FIG. 1 or any other suitable processor within a power supply or driver circuit, and the routines may be firmware embedded or otherwise stored within a memory 105B of the microcontroller 105 as shown in FIG. 1. Other suitable processing environments may be used as well, such as any computing device having sufficient memory and processing capability to execute the functional modules and capable of being operatively coupled to the power supply system 100. Some embodiments are implemented with gate-level logic or an application-specific integrated circuit (ASIC) or chip set or other such purpose built logic.

Methodology—Strobing Inhibitor

Figure 3:
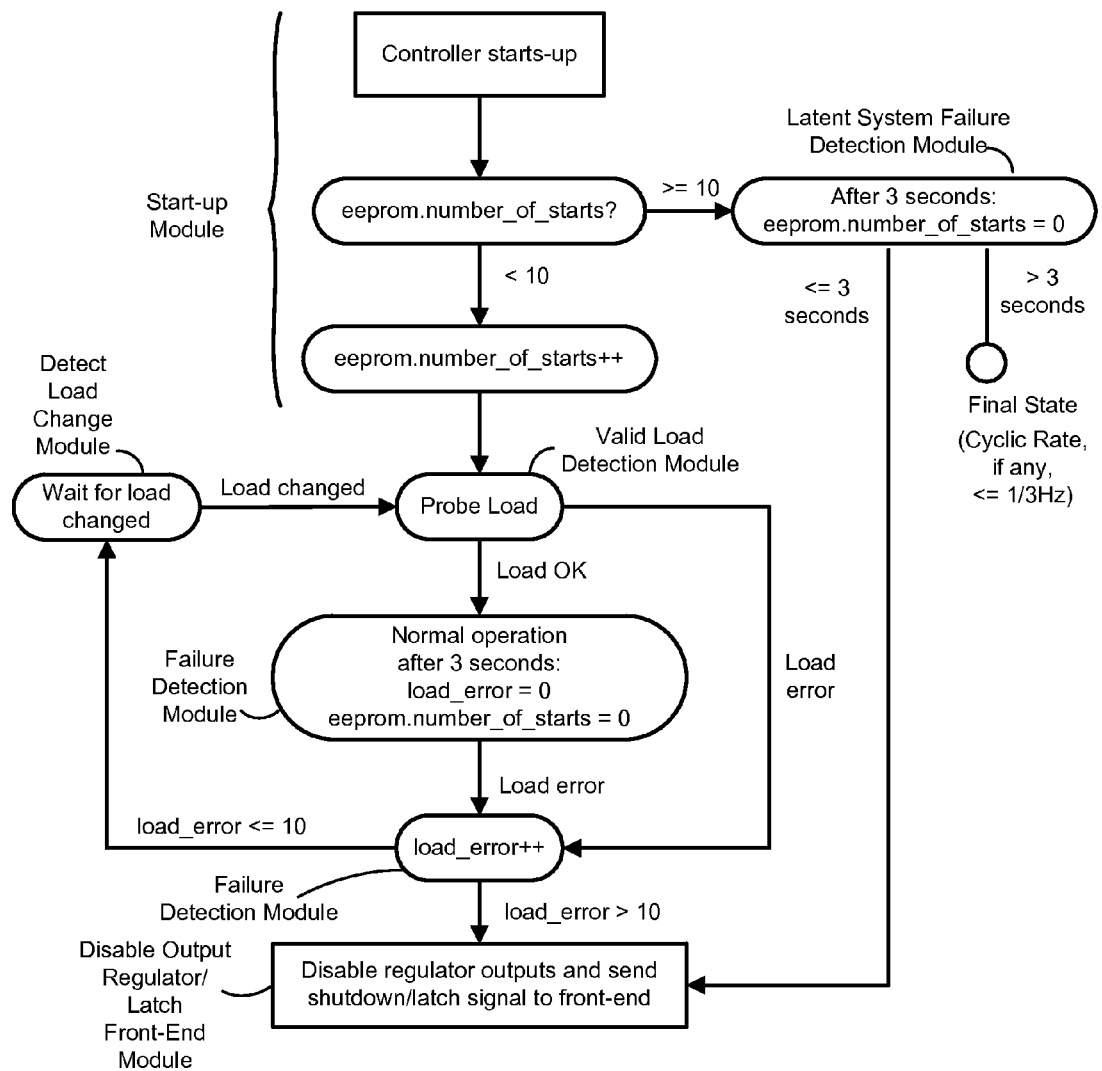
FIG. 3 shows a methodology for inhibiting cyclic light output caused by system faults in lighting systems according to embodiments disclosed herein.

FIG. 3 illustrates a method for inhibiting cyclic light output caused by system faults in lighting systems. The method may be, and in some embodiments is, carried out, for example, by the microcontroller 105 configured as shown in FIGS. 2A-2B. However, numerous other configurations may be used without departing from the scope of the invention. For ease of description, a microcontroller configured in the same way as the microcontroller 105 of FIGS. 2A-2B is referred to as carrying out the functionality of the method shown in FIG. 3.

As explained above in regards to FIGS. 2A-2B, in some embodiments two counters are used to memorize the number of failed start-up attempts of a power supply system, such as but not limited to the power supply system 100 of FIG. 1, to which a load, such as but not limited to the load 109 of FIG. 1, is connected. One counter stores information in non-volatile memory (e.g., ROM or flash memory), so that it is not lost even if the microcontroller loses power. The other counter stores information in volatile (e.g., RAM) memory, which may provide faster access. When the microcontroller starts up, the method commences with checking whether the non-volatile error counter holds a number greater than a given threshold (e.g., is eeprom.number_of_starts>=10). If so, then the method does not power-up the load right away. Rather, it waits for a certain time, such as but not limited to 3 seconds and/or substantially 3 seconds, before resetting the non-volatile counter (e.g., eeprom.number_of_starts=0). As previously explained, the time delay before resetting the counter is introduced to address fault modes where a failure lets the microcontroller repetitively lose power within the first few seconds after start up. Eventually, the power supply system halts in a final state. Here, the method includes disabling any outputs of the output regulator stage and may further include sending a shutdown/latch signal to the front end of the power supply system. This disabled/latched state persists until the input power is cycled (switched-off and on again), and then the process repeats, but without any rapid cycling.

As is further seen, the non-volatile counter is incremented every start up (e.g., eeprom.number_of_starts++). After the non-volatile counter has reached its threshold, it is reset only when the microcontroller has stable power for a minimum time, such as but not limited to 3 seconds and/or substantially 3 seconds. Thus, the non-volatile counter will not be reset if a fault mode does not let the power supply system operate stably for at least that minimum time (i.e., 3 seconds). The worst case scenario would be a failure that occurs repetitively after about 4 seconds. In such a scenario, the output cycling is limited to a frequency of less than ⅓ Hz. Other delays may be used to ensure even slower cycling if so desired. Thus, in some embodiments, the delay variables (such as the Delays M and N) are user-configurable.

Figure 4A:
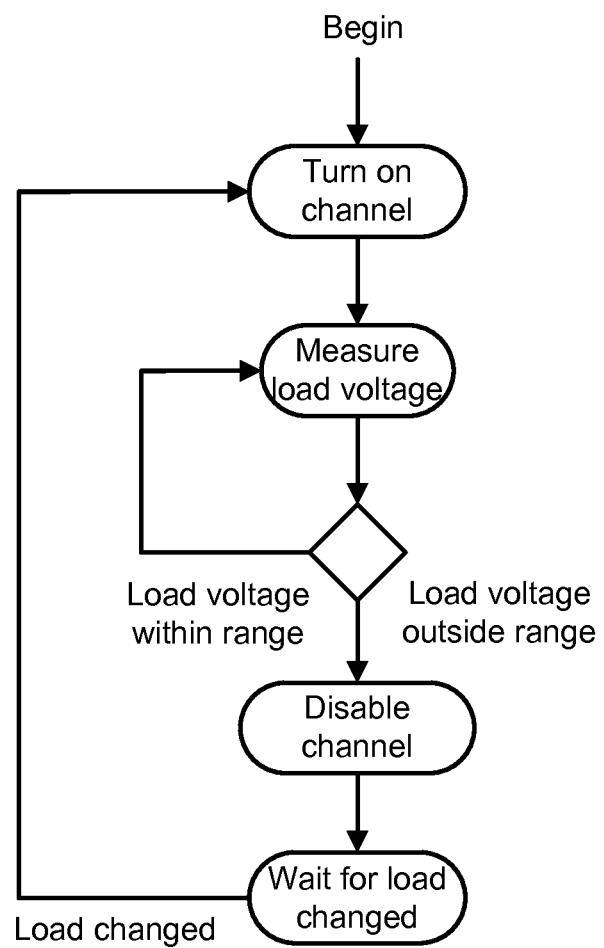
FIGS. 4A-4B each illustrate a methodology for probing a load such as a lighting system according to embodiments disclosed herein.
Figure 4B:
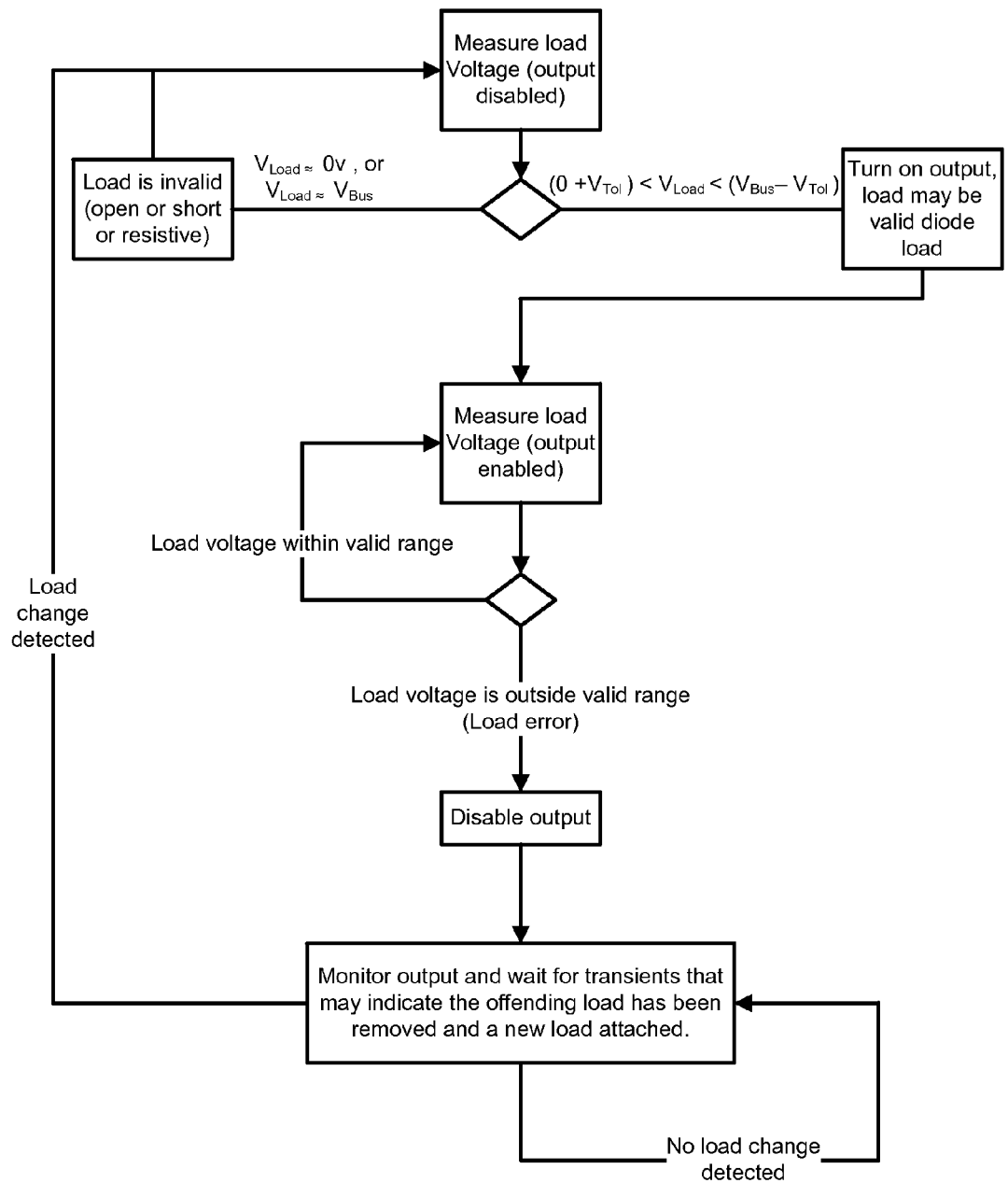

Once the non-volatile counter is incremented, the method continues with checking whether the connected load is a valid load. FIGS. 4A-B each illustrate a method for checking whether the connected load is valid, and each will be discussed in turn. If the connected load is valid, the method continues with normal power supply system operation and further includes resetting each of the volatile and non-volatile counters after a suitable delay (e.g., 3 seconds) of uninterrupted operation. Thus, if the power supply system stays in operation for at least 3 seconds, then the load_error and eeprom.number_of_starts counters are both set to 0. On any error, the method includes incrementing the volatile counter (e.g., load_error++). If the volatile counter is greater than the given threshold (e.g., is load_error>10), then the method includes going into a halt mode and waiting there until the input power is cycled. A disable command may be, and in some embodiments is, sent to the output regulator stage and/or a latch command may be, and in some embodiments is, sent to the front end to prevent power from being applied to the load, as explained throughout.

Otherwise, the method continues with waiting for the error condition to go away (e.g., wait for a load changed condition), assuming the load caused the error. Waiting for the load to change may prevent the power supply system from cycling. Where the power supply system does not reliably wait at the wait for load changed state, the volatile counter (e.g., load_error) ensures that the processing loop including probe load, normal operation, load_error++, and waiting for load changed is cycled at a maximum of, for example, 10 times, before it is interrupted (e.g., load_error>10) and halted. Again, a disable command may be sent to the output regulator stage and/or a latch command may be sent to the front end to prevent power from being applied to the load.

Methodology—Load Detection

FIG. 4A shows a method for probing a load, such as but not limited to the light source load 109. The method shown in FIG. 4A assumes a multi-channel power supply, where each channel drives a separate load, though embodiments are not so limited. Thus, some embodiments include using the method in connection with a single output power supply. The method includes allowing a small amount of current flowing through the load to allow for sensing characteristics of the load without enabling the output driver (e.g., a current in the microamp to milliamp range, or a current that is a percentage of the overall current capacity such as 10% or smaller, or otherwise sufficient to make desired measurements but not necessarily sufficient to noticeably turn on one or more light sources in the load). This small test current flow could be, for example, present all the time, or selectively enabled and disabled by the microcontroller 105. For instance, this relatively low test current could continuously flow, for example, through a high impedance path from the DC voltage bus to the load to ground. Alternatively, this path could also be switched open or closed by the microcontroller 105 to enable/disable. Note that such circuitry to facilitate application of the test current may be implemented independently of the output regulator stage 107, and that the output regulator stage output may be disabled during any such testing, and the test current appears as an almost undetectable leakage current through the load.

The method begins with turning on a given channel and measuring the load voltage. Then a determination is made as to whether the load voltage is within a given range. If so, then the channel remains enabled so the power supply continues to run, and monitoring of the load voltage continues. If, on the other hand, the load voltage is not within the given range, then the method continues with disabling the output and/or channel, and waiting for the load to be changed. Thus, whenever an incorrect load has been detected, the power supply is assumed to be in a failure state, and the output of the power supply is disabled (e.g., the microcontroller 105 issues a disable signal to the output regulator stage 107). Once disabled, a valid load must be connected for the power supply to enter normal operation. There are a number of ways to determine if the load has been changed. In some embodiments, the power supply will continually monitor the load return voltage but will not re-enable the output until the following two conditions have been met: (1) a rapid positive slope is detected on the return voltage line; and (2) the return voltage settles at a voltage less than the bus voltage. These two conditions may be readily detected, for example, by the Detect Load Change Module of the microcontroller 105 and are indicative that a new load has been connected to the power supply and may further indicate that the new load is not a short circuit (or a circuit that otherwise appears as an improper resistance). Once these two conditions have been met, normal operation may be resumed and the monitoring process continues. In a more general sense, the Detect Load Change Module may be programmed or otherwise configured to detect an open-circuit (e.g., $V_{Load}=V_{Bus}$), a short-circuit (e.g., $V_{Load}=0v$), or a rapid slope (positive or negative) on the main or return voltage lines followed by a settled voltage across the main/return lines may be used to indicate a load change. As previously indicated, an output element across the main/return lines (e.g., a capacitor) may be monitored to detect such changes, or the main and/or return lines may be directly monitored, for example. As also previously explained, fail codes may also be used in assessing whether a load has been changed. In any such scenarios, the output may be monitored for transients or other indicia that may indicate the offending load has been removed and a new load attached. If the new load is or otherwise becomes invalid, the power supply will detect that (e.g., because the load voltage is too low when compared to a preset reference voltage or otherwise out of the specified range) and the power supply will re-enter the failure mode and the output/channel will be disabled until a new load is applied, and so on.

FIG. 4B illustrates a method for probing a load such as a light source load 109. Like the method of FIG. 4A, this method may be implemented independently or in conjunction with other functionalities, and may be applied to a multichannel power supply or a power supply with one output, and the claimed invention is not intended to be limited to any particular configuration particular application. FIG. 4B assumes a multichannel power supply. This method is similar to that depicted in FIG. 4A, except that initial load measurements are made with the channel/output disabled. In addition, the method shown in FIG. 4B further allows for detection of improper resistive loads. The method also includes allowing a small amount of test current flowing through the load in order to detect changes (e.g., 50 microamps to 500 milliamps), as previously explained with reference to FIG. 4A.

FIG. 4B illustrates a method for probing a load such as a light source load 109. Like the method of FIG. 4A, this method may be implemented independently or in conjunction with other functionalities, and may be applied to a multichannel power supply or a power supply with one output, and the claimed invention is not intended to be limited to any particular configuration particular application. FIG. 4B assumes a multichannel power supply. This method is similar to that depicted in FIG. 4A, except that initial load measurements are made with the channel/output disabled. In addition, the method shown in FIG. 4B further allows for detection of improper resistive loads. The method also includes allowing a small amount of test current flowing through the load in order to detect changes (e.g., 50 microamps to 500 milliamps), as previously explained with reference to FIG. 4A.

As can be seen, the method includes measuring the load voltage ($V_{Load}$) with the channel disabled (with only small test current flowing that is sufficient to allow for measurements), and then making a determination depending in the measured value. In particular, if the load voltage $V_{Load}$ is close or equal to the bus voltage $V_{Bus}$ (e.g., open-circuit), the output remains disabled. If the load voltage $V_{Load}$ is close or equal to zero volts (e.g., short circuit or improper resistive load), the output remains disabled. Note that a voltage tolerance ($V_{Tol}$) can be established so as to provide a range offending voltage levels, such as if $V_{Load}$=0 volts+/−100 millivolts, then assume short circuit or improper resistive load; likewise, if $V_{Load}$=$V_{Bus}$+/−100 millivolts, then assume open circuit. Variations on these initial assessments will be apparent in light of this disclosure, such as will be discussed with respect to the example embodiments of FIGS. 4A-4B.

Otherwise, the load may be a valid diode load and the output is therefore enabled and immediately monitored. For instance, when: $(0+V_{Tol})<V_{Load}<(V_{Bus}-V_{Tol})$, then allow testing of output at full output current. If the load voltage $V_{Load}$ stays in the valid operating range with full output current, the methodology allows the power supply to continue to operate. However, if at any time the load voltage $V_{Load}$ falls outside the valid range, the method continues with disabling the output. Once a load is detected as invalid, the power supply will monitor the load voltage and look for the old load to be disconnected (e.g., leaving open-circuit conditions), and wait for a new load to be attached. Thus, the method continues with monitoring the output for transients or other indicia that may indicate the offending load has been removed and a new load attached. If not, the method continues to monitor for a load change. When a new load is attached the process can be repeated.

The methods and systems described herein are not limited to a particular hardware or software configuration, and may find applicability in many computing or processing environments. The methods and systems may be implemented in hardware or software, or a combination of hardware and software. The methods and systems may be implemented in one or more computer programs, where a computer program may be understood to include one or more processor executable instructions. The computer program(s) may execute on one or more programmable processors, and may be stored on one or more storage medium readable by the processor (including volatile and non-volatile memory and/or storage elements), one or more input devices, and/or one or more output devices. The processor thus may access one or more input devices to obtain input data, and may access one or more output devices to communicate output data. The input and/or output devices may include one or more of the following: Random Access Memory (RAM), Redundant Array of Independent Disks (RAID), floppy drive, CD, DVD, magnetic disk, internal hard drive, external hard drive, memory stick, or other storage device capable of being accessed by a processor as provided herein, where such aforementioned examples are not exhaustive, and are for illustration and not limitation.

The computer program(s) may be implemented using one or more high level procedural or object-oriented programming languages to communicate with a computer system; however, the program(s) may be implemented in assembly or machine language, if desired. The language may be compiled or interpreted.

As provided herein, the processor(s) may thus be embedded in one or more devices that may be operated independently or together in a networked environment, where the network may include, for example, a Local Area Network (LAN), wide area network (WAN), and/or may include an intranet and/or the internet and/or another network. The network(s) may be wired or wireless or a combination thereof and may use one or more communications protocols to facilitate communications between the different processors. The processors may be configured for distributed processing and may utilize, in some embodiments, a client-server model as needed. Accordingly, the methods and systems may utilize multiple processors and/or processor devices, and the processor instructions may be divided amongst such single- or multiple-processor/devices.

The device(s) or computer systems that integrate with the processor(s) may include, for example, a personal computer(s), workstation(s) (e.g., Sun, HP), personal digital assistant(s) (PDA(s)), handheld device(s) such as cellular telephone(s) or smart cellphone(s), laptop(s), handheld computer(s), or another device(s) capable of being integrated with a processor(s) that may operate as provided herein. Accordingly, the devices provided herein are not exhaustive and are provided for illustration and not limitation.

References to "a microprocessor" and "a processor", or "the microprocessor" and "the processor," may be understood to include one or more microprocessors that may communicate in a stand-alone and/or a distributed environment(s), and may thus be configured to communicate via wired or wireless communications with other processors, where such one or more processor may be configured to operate on one or more processor-controlled devices that may be similar or different devices. Use of such "microprocessor" or "processor" terminology may thus also be understood to include a central processing unit, an arithmetic logic unit, an application-specific integrated circuit (IC), and/or a task engine, with such examples provided for illustration and not limitation.

Furthermore, references to memory, unless otherwise specified, may include one or more processor-readable and accessible memory elements and/or components that may be internal to the processor-controlled device, external to the processor-controlled device, and/or may be accessed via a wired or wireless network using a variety of communications protocols, and unless otherwise specified, may be arranged to include a combination of external and internal memory devices, where such memory may be contiguous and/or partitioned based on the application. Accordingly, references to a database may be understood to include one or more memory associations, where such references may include commercially available database products (e.g., SQL, Informix, Oracle) and also proprietary databases, and may also include other structures for associating memory such as links, queues, graphs, trees, with such structures provided for illustration and not limitation.

References to a network, unless provided otherwise, may include one or more intranets and/or the internet. References herein to microprocessor instructions or microprocessor-executable instructions, in accordance with the above, may be understood to include programmable hardware.

Unless otherwise stated, use of the word "substantially" may be construed to include a precise relationship, condition, arrangement, orientation, and/or other characteristic, and deviations thereof as understood by one of ordinary skill in the art, to the extent that such deviations do not materially affect the disclosed methods and systems.

Throughout the entirety of the present disclosure, use of the articles "a" and/or "an" and/or "the" to modify a noun may be understood to be used for convenience and to include one, or more than one, of the modified noun, unless otherwise specifically stated. The terms "comprising", "including" and "having" are intended to be inclusive and mean that there may be additional elements other than the listed elements.

Elements, components, modules, and/or parts thereof that are described and/or otherwise portrayed through the figures to communicate with, be associated with, and/or be based on, something else, may be understood to so communicate, be associated with, and or be based on in a direct and/or indirect manner, unless otherwise stipulated herein.

Although the methods and systems have been described relative to a specific embodiment thereof, they are not so limited. Obviously many modifications and variations may become apparent in light of the above teachings. Many additional changes in the details, materials, and arrangement of parts, herein described and illustrated, may be made by those skilled in the art.

What is claimed is:

1. A method comprising:
    measuring a load voltage of a power supply to which a load is connected and receiving power; and
    in response to the measured load voltage being outside a specified range:
        disabling an output of the power supply; and
        preventing the output of the power supply from being re-enabled until a load change is detected.

2. The method of claim 1, wherein prior to measuring the load voltage, the method comprises enabling the output of the power supply to provide a small test current that is 10% or less of a full current capability of the power supply.

3. The method of claim 1, wherein measuring comprises:
    measuring a load voltage of a power to which a load is connected and receiving power, wherein the power supply comprises an output regulator stage that receives a bus voltage and generates an output voltage therefrom to be applied to the load;
and wherein the method further comprises:
    determining if the measured load voltage is outside the specified range by comparing the measured load voltage to at least one of the bus voltage and ground potential.

4. The method of claim 3, wherein if the measured load voltage is within a given tolerance of the bus voltage or ground potential, the method further comprises not enabling or otherwise disabling the output of the power supply.

5. The method of claim 3, wherein if the measured load voltage is between the bus voltage less a given tolerance and ground potential plus a given tolerance, the method further comprises enabling the output of the power supply.

6. The method of claim 5, further comprising re-measuring the load voltage.

7. The method of claim 6, wherein in response to the re-measured load voltage being outside the specified range, the method further comprises:
    disabling the output of the power supply; and
    preventing the output of the power supply from being re-enabled until a load change is detected.

8. A non-transitory computer readable medium encoded with instructions that, when executed by one or more processors, cause a power supply to power a light source load, by performing operations of:
    measuring a load voltage of the power supply; and
    in response to the measured load voltage being outside a specified range:
        disabling output of the power supply; and
        detecting a load change before re-enabling the output of supply.

9. The non-transitory computer readable medium of claim 8, wherein prior to measuring the load voltage, the processor performs operations of enabling the output of the power supply to provide a small test current that is 10% or less of full current capability of the power supply.

10. The non-transitory computer readable medium of claim 8, wherein the power supply comprises an output regulator stage that receives a bus voltage and generates an output voltage therefrom to be applied to the light source load, and the processor performs further operations of determining if the measured load voltage is outside the specified range by comparing the measured load voltage to at least one of the bus voltage and ground potential.

11. The non-transitory computer readable medium of claim 10, wherein if the measured load voltage is within a given tolerance of the bus voltage or ground potential, the processor performs further operations of not enabling or otherwise disabling the output of the power supply.

12. The non-transitory computer readable medium of claim 10, wherein if the measured load voltage is between the bus voltage less a given tolerance and ground potential plus a given tolerance, the processor performs further operations of enabling the output of the power supply.

13. The non-transitory computer readable medium of claim 12, wherein the processor performs further operations of re-measuring the load voltage.

14. The non-transitory computer readable medium of claim 13, wherein in response to the re-measured load voltage being outside the specified range, the processor performs further operations of:
    disabling the output of the power supply; and
    preventing the output of the power supply from being re-enabled until a load change is detected.

15. A system for powering a light source load with a power supply, comprising:
    an input conversion stage configured to convert a first voltage source to a second voltage source;
    an output regulator stage configured to receive the second voltage source and to provide a power source to drive the load; and
    a controller comprising a processor and a memory with instructions encoded thereon that, when executed by the processor, cause the system to:
    measure a load voltage of the power supply; and
    in response to the measured load voltage being outside a specified range:
        disable output of the power supply; and
        prevent the output of the power supply from being re-enabled until a load change is detected.

16. The system of claim 15, wherein the system is configured to allow a current to flow through the load to facilitate sensing characteristics of the load without enabling the output regulator stage, wherein the current is in the microamp to milliamp range.

17. The system of claim 15, wherein the output regulator stage is configured to receive a bus voltage from the input conversion stage and to generate an output voltage therefrom to be applied to the load, and wherein the system is further configured to determine if the measured load voltage is outside the specified range by comparing the measured load voltage to at least one of the bus voltage and ground potential.

18. The system of claim 17, wherein if the measured load voltage is within a given tolerance of the bus voltage or ground potential, the system is further configured to not enable or to otherwise disable the output of the power supply.

19. The system of claim 17, wherein if the measured load voltage is between the bus voltage less a given tolerance and ground potential plus a given tolerance, the system is further configured to enable the output of the power supply.

20. The system of claim 19, wherein the system is further configured to re-measure the load voltage one or more times, and in response to the re-measured load voltage being outside the specified range, the system is further configured to:
    disable the output of the power supply; and
    prevent the output of the power supply from being re-enabled until a load change is detected.

* * * * *